United States Patent
Zhang et al.

(10) Patent No.: US 11,267,930 B2
(45) Date of Patent: Mar. 8, 2022

(54) ANTIMICROBIAL THERMOPLASTIC POLYUETHANES

(71) Applicant: Lubrizol Advanced Materials, Inc., Cleveland, OH (US)

(72) Inventors: Hua Zhang, Cottonwood Hts., UT (US); Roger W. Day, Solon, OH (US); Richard Woofter, Medina, OH (US); Umit G. Makal, Kocaeli (TR); Kiara L. Smith, Mayfield Hts., OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 238 days.

(21) Appl. No.: 16/481,268

(22) PCT Filed: Jan. 30, 2018

(86) PCT No.: PCT/US2018/015837
§ 371 (c)(1),
(2) Date: Jul. 26, 2019

(87) PCT Pub. No.: WO2018/140910
PCT Pub. Date: Aug. 2, 2018

(65) Prior Publication Data
US 2019/0389998 A1    Dec. 26, 2019

Related U.S. Application Data

(60) Provisional application No. 62/451,899, filed on Jan. 30, 2017.

(51) Int. Cl.
| | | |
|---|---|---|
| *C08G 18/76* | (2006.01) | |
| *C08G 18/32* | (2006.01) | |
| *C08K 5/31* | (2006.01) | |
| *C09D 5/16* | (2006.01) | |
| *C09D 175/04* | (2006.01) | |

(52) U.S. Cl.
CPC ..... *C08G 18/7664* (2013.01); *C08G 18/3206* (2013.01); *C08G 18/3215* (2013.01); *C08K 5/31* (2013.01); *C09D 5/1662* (2013.01); *C09D 5/1687* (2013.01); *C09D 175/04* (2013.01)

(58) Field of Classification Search
None
See application file for complete search history.

(56) References Cited

U.S. PATENT DOCUMENTS

| | | | |
|---|---|---|---|
| 6,261,271 B1* | 7/2001 | Solomon | A61L 27/34 604/265 |
| 2004/0116636 A1 | 6/2004 | Luthra et al. | |
| 2012/0259064 A1 | 10/2012 | Greiner et al. | |
| 2012/0282213 A1 | 11/2012 | Weiss et al. | |
| 2012/0283664 A1 | 11/2012 | Riemann et al. | |
| 2013/0231394 A1* | 9/2013 | Arndt | A61L 15/44 514/635 |
| 2015/0165400 A1* | 6/2015 | Kulkarni | C07D 223/28 540/589 |
| 2015/0210799 A1* | 7/2015 | Tanaka | C08G 18/3206 525/453 |

FOREIGN PATENT DOCUMENTS

EP    2000031 A1    12/2008

OTHER PUBLICATIONS

Wikipedia article for polyurethanes. (Year: 2021).*

* cited by examiner

*Primary Examiner* — Robert T Butcher
(74) *Attorney, Agent, or Firm* — Eryn Ace Fuhrer; Teresan W. Gilbert

(57) ABSTRACT

The disclosed technology provides thermoplastic polyurethane compositions having non-leaching antimicrobial properties while still maintaining good physical properties, methods of making the same, and articles, including medical devices, made from such compositions. The disclosed technology includes a process of making an antimicrobial polymer composition, where the process includes mixing an antimicrobial additive into a polymeric material; wherein said polymeric material comprises a polymeric backbone made up of urethane linkages derived from a polyisocyanate and a polyol; and wherein said mixing occurs under conditions that result in the breaking of a minority of said urethane bonds resulting in reactive isocyanate groups; and wherein two or more of said reactive isocyanate groups react with said antimicrobial additive to covalently bond said antimicrobial additive into the polymeric backbone of said polymeric material; resulting in an antimicrobial polymer composition.

13 Claims, No Drawings

ANTIMICROBIAL THERMOPLASTIC POLYUETHANES

CROSS REFERENCE TO RELATED APPLICATION

This application is a national phase entry under 35 U.S.C. 371 of PCT/US2018/015837 filed Jan. 30, 2018, which claims the benefit of U.S. Provisional Application No. 62/451,899 filed Jan. 30, 2017.

FIELD OF THE INVENTION

The disclosed technology provides thermoplastic polyurethane (TPU) compositions having non-leaching antimicrobial properties while still maintaining good physical properties, methods of making the same, and articles made from such compositions.

BACKGROUND

Antimicrobials are chemical compounds that reduce and/or mitigate the growth or development of microbial organisms. Antimicrobial additives work by a variety of mechanisms dependent upon the mode of action, composition, degree of activity, and application. When used properly, antimicrobial compounds lead to the death or arrested growth of the targeted microorganisms. Since their discovery in the early 1900s, antimicrobials have transformed the prevention and treatment of infectious diseases. Antimicrobial additives are currently used across a very wide array of applications, including the use of antimicrobials in the polymeric materials used in various medical applications. For example, polymeric materials that include antimicrobial additives can be used to make articles and devices for medical applications that will then eliminate, reduce and/or mitigate the growth or development of microbial organisms and so assist in the prevention and treatment of infectious diseases, including detrimental infections on medical implants and devices.

However, antimicrobials may also be hazardous to human health. Therefore, there is a need for antimicrobial additives that do not leach out of the materials in which they are used. Further there is a need for antimicrobial additives which do not leach out of the materials in which they are used and which remain effective over the life of usage of the material, or the article or device made from the material in which the antimicrobial additive is used.

Ideally, the antimicrobial agents that provide these non-leaching antimicrobial properties would have a proven history of use and effective activity against various microorganisms without any adverse effect on patients' health. The antimicrobial material, or other materials containing the antimicrobial additive, should be applicable to medical or other health care product and/or surface thereof by commercially-viable manufacturing methods such as molding, extrusion, and all other thermoplastic methods of 'conversion' or solvent-based processing, water-borne systems, and 100%-solids (crosslinkable) liquid. In addition, the antimicrobial additive should not interfere with the physiochemical and/or mechanical properties of the treated material, medical or other health care product and/or surface there.

Bacterial infection is a common complication related to the use of medical devices. Advances in various medical devices, including but not limited to catheters, vascular access devices, peripheral lines, intravenous (IV) sites, drains, gastric feeding tubes, trachea tubes, stents, guidewires, pacemakers, and other implantable devices, have benefited diagnostic and therapeutic medical care. However, bacterial infections are becoming a serious and common complication related to the use of medical devices, especially those implanted and/or used inside the patient with a compromised defense system.

One approach to reduce device-related infections is to develop surfaces with bactericidal activity, for example by making or coating the surface with a material that will elute and/or release antimicrobial compounds. Almost all treatments fall into one of the following three categories: 1) adsorption of the antimicrobial additive into the surface of materials passively or in combination with surfactants or by way of surface-bonded polymers; 2) incorporation of the antimicrobial additive into a polymer coating applied on the material surface; 3) compounding the antimicrobial additive into the bulk material comprising the device.

However, all of these approaches are based on a leaching mechanism where the antimicrobial additive leaches out of the material in which it has been added. This means the antimicrobial performance of the material is generally dependent on the concentration of the antimicrobial additive (loading) and the rate of its release from the material to which it has been added. It is often very difficult to control the release rate and maintain a constant level of concentration at the surface as the release rate depends on many factors such as actual concentration, solubility, and diffusivity of these active ingredients in the bulk polymer which may also change over the time of use. All of these issues mean approaches based on this leaching mechanism are often ineffective.

Therefore, a simple and cost effective method to create an antimicrobial composition that is useful for medical applications, and which is not dependent on a leaching mechanism to provide its antimicrobial properties is needed.

SUMMARY

The disclosed technology provides thermoplastic polyurethane (TPU) compositions having non-leaching antimicrobial properties while still maintaining good physical properties, methods of making the same, and articles made from such compositions.

The disclosed technology provides a process of making an antimicrobial polymer composition, where said process includes the step of: (a) mixing an antimicrobial additive into a polymeric material; wherein the polymeric material includes a polymeric backbone made up of urethane linkages derived from a polyisocyanate and a polyol; and where the mixing occurs under conditions that result in the breaking of a minority of said urethane bonds resulting in reactive isocyanate groups; and wherein two or more of said reactive isocyanate groups react with said antimicrobial additive to covalently bond said antimicrobial additive into the polymeric backbone of said polymeric material; resulting in an antimicrobial polymer composition.

In some embodiments, given the means by which the antimicrobial additive is reacted into the backbone of the polymeric backbone, the antimicrobial properties of the resulting antimicrobial polymer composition are substantially or completely non-leaching and the physical properties of the antimicrobial polymer composition can be preserved.

The disclosed technology further discloses the described process where the antimicrobial additive includes a deprotonated guanidine compound, a deprotonated biguanidine compound, or a mixture thereof. These deprotonated compounds may be partially deprotonated guanidine and/or biguanidine compounds, fully deprotonated guanidine and/or biguanidine compounds, or mixtures thereof. In some embodiments, the antimicrobial additive is deprotonated polyhexamethylene biguanide (PHMB), also referred to as free base PHMB, and in some embodiments the antimicrobial additive is free of protonated PHMB.

The disclosed technology further discloses the described process where the antimicrobial additive includes deprotonated PHMB.

The disclosed technology further discloses the described process where the polymeric material includes a thermoplastic polyurethane derived from (a) a polyisocyanate component, (b) a polyol component, and (c) an optional chain extender component.

The disclosed technology further discloses the described process where the polymeric material includes a thermoplastic polyurethane derived from (a) diphenylmethane diisocyanate or a hexamethylene diisocyanate, (b) a polyether polyol, and (c) a butane diol component. In some embodiments where the polyether polyol is an aromatic polyether polyol.

The disclosed technology further discloses the described process where the mixing occurs at a temperature from 160 to 225 degrees Celsius. The mixing may also occur from 180 to 225, or from 160 to 200 degrees Celsius. In some embodiments, the range of temperatures where the mixing occurs is important in order to incorporate the antimicrobial additives into the polymeric material in such a way that the additive is reacted in to the backbone of the polymeric material but the urethane linkages in the polymeric materials do not reverted to such a degree that extensive crosslinking occur, impacting the physical properties of the polymeric material.

The disclosed technology further discloses the described process where the mixing occurs in an extruder where the antimicrobial additive is added to the polymeric material and wherein said mixing occurs at a temperature between 180 and 225 degrees Celsius, where the extruder comprises a twin screw extruder with co-rotating, self-wiping screws, with a mixture of conveying and mixing elements, and a length to diameter ratio of 20:1 to 50:1.

The disclosed technology further discloses the described process where the antimicrobial additive comprises a deprotonated guanidine compound, a deprotonated biguanidine compound, or a mixture thereof; where the polyisocyanate which is inevitably liberated from reversal of the polyurethane bond as the polyurethane is extruded at the temperatures indicated and where the polyisocyanate reacts with said antimicrobial additive and said polymeric material to covalently bond said antimicrobial additive to the polymeric backbone of said polymeric material; and where the mixing occurs at a temperature between 180 and 225 degrees Celsius, or even from 190 to 210 degrees Celsius.

The disclosed technology further discloses the described process where the antimicrobial additive includes polyhexamethylene biguanide, deprotonated polyhexamethylene biguanide, partially deprotonated polyhexamethylene biguanide or a combination thereof; where the polymeric material includes a thermoplastic polyurethane derived from (a) diphenylmethane diisocyanate, (b) a polyether polyol, and (c) a butane diol component; and where the mixing occurs in an extruder where the antimicrobial additive is added to the polymeric material and wherein said mixing occurs at a temperature between 180 and 225 degrees Celsius, where the extruder comprises a twin screw extruder with co-rotating, self-wiping screws, with a mixture of conveying and mixing elements, and a length to diameter ratio of 20:1 to 50:1.

The disclosed technology further discloses the described process where the resulting antimicrobial polymer composition is non-leaching as determined by exhibiting a zero zone of inhibition in the AATCC 147 Assessment of Antimicrobial Finishes on Textile Materials: Parallel Streak Method.

The disclosed technology further discloses an antimicrobial polymer composition made from a polymeric material and an antimicrobial additive, where the polymeric material comprises a polymeric backbone comprising urethane linkages derived from a polyisocyanate and a polyol; and where at least some of the antimicrobial additive is covalently bonded into said polymeric backbone of the polymeric material by two or more linkages between the nitrogen atoms of the guanide or biguanide and the isocyanate.

The disclosed technology further discloses the described composition where the antimicrobial additive includes a deprotonated guanidine compound, a deprotonated or partially deprotonated biguanidine compound, or a mixture thereof. These deprotonated compounds may be partially deprotonated guanidine and/or biguanidine compounds, fully deprotonated guanidine and/or biguanidine compounds, or mixtures thereof. In some embodiments, the antimicrobial additive is deprotonated polyhexamethylene biguanide (PHMB), also referred to as free base PHMB, and in some embodiments the antimicrobial additive is free of protonated PHMB.

The disclosed technology further discloses the described composition where the antimicrobial additive includes deprotonated PHMB.

The disclosed technology further discloses the described composition where the polymeric material includes a thermoplastic polyurethane derived from (a) a polyisocyanate component, (b) a polyol component, and (c) an optional chain extender component.

The disclosed technology further discloses the described composition where the polymeric material includes a thermoplastic polyurethane derived from (a) diphenylmethane diisocyanate, hydrogenated MDI or a hexamethylene diisocyanate, (b) a polyether polyol, and (c) a butane diol component.

The disclosed technology further discloses the described composition where the antimicrobial additive comprises a deprotonated guanidine compound, a deprotonated biguanidine compound, or a mixture thereof; where the polyisocyanate which is liberated during the extrusion process at the temperatures indicated reacts with said antimicrobial additive and said polymeric material to covalently bond said antimicrobial additive to the polymeric backbone of said polymeric material.

The disclosed technology further discloses the described composition where the antimicrobial polymer composition is non-leaching as determined by the AATCC 147 Assessment of Antimicrobial Finishes on Textile Materials: Parallel Streak Method.

The disclosed technology further discloses the described composition where the antimicrobial additive includes a deprotonated guanidine compound, a deprotonated biguanidine compound, or a mixture thereof; where the polymeric material comprises a thermoplastic polyurethane derived from (a) diphenylmethane diisocyanate, (b) a polyether polyol, and (c) a butane diol component.

The disclosed technology further discloses the articles made with the antimicrobial polymer composition described herein. In some embodiments, the articles are made from antimicrobial polymer compositions made from a polymeric material and an antimicrobial additive, where the polymeric material includes a polymeric backbone comprising urethane linkages derived from a polyisocyanate and a polyol; and where the antimicrobial additive is covalently bonded into said polymeric backbone of the polymeric material by two or more urethane (or carbamate) linkages.

The disclosed technology further discloses the described article where the antimicrobial additive includes a deprotonated guanidine compound, a deprotonated biguanidine compound, or a mixture thereof; where the polymeric material comprises a thermoplastic polyurethane derived from (a) diphenylmethane diisocyanate, (b) a polyether polyol, and (c) a butane diol component.

The disclosed technology further discloses the described article where the antimicrobial polymer composition described herein is coated onto a material and/or surface forming the article.

DETAILED DESCRIPTION

Various preferred features and embodiments will be described below by way of non-limiting illustration.

The disclosed technology provides thermoplastic polyurethane (TPU) compositions having non-leaching antimicrobial properties while still maintaining good physical properties, methods of making the same, and articles made from such compositions.

The disclosed technology provides a process of making an antimicrobial polymer composition, where said process includes the step of: (a) mixing an antimicrobial additive into a polymeric material; wherein the polymeric material includes a polymeric backbone made up of urethane linkages derived from a polyisocyanate and a polyol; and where the mixing occurs under conditions that result in the breaking of a minority of said urethane bonds resulting in reactive isocyanate groups; and wherein two or more of said reactive isocyanate groups react with said antimicrobial additive to covalently bond said antimicrobial additive into the polymeric backbone of said polymeric material; resulting in an antimicrobial polymer composition.

The Antimicrobial Additive

The antimicrobial additives for use in the disclosed technology provide antimicrobial properties to the polymeric materials into which they are incorporated, and they have at least two groups and/or reactive sites that can react with isocyanate groups to form covalent bonds. This is what allows them to react into the backbone of the polymeric materials described here and what results in the described antimicrobial polymer compositions.

Suitable antimicrobial additive includes deprotonated guanidine compounds, deprotonated biguanidine compounds, or a mixture thereof. These deprotonated compounds may be partially deprotonated guanidine and/or biguanidine compounds, fully deprotonated guanidine and/or biguanidine compounds, or mixtures thereof. In some embodiments, the antimicrobial additive is deprotonated polyhexamethylene biguanide (PHMB), also referred to as free base PHMB (one example of which is commercially available from Matrix). In some embodiment, the antimicrobial additive may also include protonated guanidine and/or biguanidine compounds. In other embodiments, the antimicrobial additive is substantially free of or even completely free of protonated guanidine and/or biguanidine compounds.

In addition to the antimicrobial additive described above, one or more additional antimicrobial additives may be used in the compositions described herein. These additives would not react into the backbone in the way that those additives described will, but the additional antimicrobial additives could be added to the compositions in more convention ways, including (i) adsorption of the antimicrobial additive to the surface of materials passively or in combination with surfactants or by way of surface-bonded polymers; (ii) incorporation of the antimicrobial additive into a polymer coating applied on the material surface; (iii) compounding the antimicrobial additive into the bulk material comprising the device.

Suitable antimicrobial additives that may be used as these additional antimicrobial additives are not overly limited.

They can be organic or organometalic compounds such as quaternary ammonium salts, phenols, alcohols, aldehydes, iodophores, poly quats (such as oligermeric poly quats derivatized from an ethylenically unsaturated diamine and an ethylenically unsaturated dihalo compound), biguanides, benzoates, parabens, sorbates, propionates, imidazolidinyl urea, 1-(3-chloroallyl)-3,5,7-triaza-1-azoniaadamantane chloride (Dowacil 200, Quaternium), isothiazolones, DMDM hydantoin (2,3-imidazolidinedione), phenoxyethanol, bronopol, fluoroquinolones (such as ciprofloxacin), "potent" beta-lactams (third and fourth generation cephalosporins, carbapenems), beta-lactam/beta-lactamase inhibitors, glycopeptides, aminoglycosides, antibiotic drugs, heparin, phosphorylcholine compounds, sulfobetaine, carboxybetaine, and organometallic salts selected from silver salts, zinc salts, and copper salts and their derivatives. Examples of these antimicrobial agents includes pharmaceutical drugs such as penicillin, trichlosan, functional biguanides, mono-functional polyquaterniums, quaternized mono-functional polyvinylpyrrolidones (PVP), silane quaternary ammonium compounds, and other quaternized ammonium salts.

In one embodiment, the additional antimicrobial additive is a quaternary ammonium molecule disclosed in U.S. Pat. No. 6,492,445 B2 (incorporated herein by reference).

Further examples of suitable mono-functional antimicrobial compounds include 2-hydroxyethyl di methyl dodecyl ammonium chloride, 2-hydroxyethyldimethyloctadecylammonium chloride, esterquats such as Behenoyl PG-trimonium chloride from Mason Chemical Company, Fluoroquats. Other small molecular diol bearing antimicrobial active centers can be incorporated into polyurethane backbone as chain extender. Examples of such antimicrobial chain extender includes: diester quats such as Methyl bis[ethyl(tallowate)]-2-hydroxyethyl]ammonium methylsulfate (CAS No. 91995-81-2), Ethoquads such as Octadecylmethylbis(2-hydroxyethyl)ammonium chloride (CAS No. 3010-24-0), Oleyl-bis-(2-hydroxyethyl)methylammonium chloride, Polyoxyethylene(15)cocoalkylmethylammonium chloride (CAS No. 61791-10-4) available from Lion Akzo Co. Ltd, and the like.

However, in some embodiments no additional antimicrobial additives are present. Rather only the antimicrobial additives described above, which have at least two groups and/or reactive sites that can react with isocyanate groups to form covalent bonds, are used in the processes described herein and to make the compositions described herein. In other words, in some embodiments the antimicrobial additive is free of additives that do not have at least two groups and/or reactive sites that can react with isocyanate groups to form covalent bonds.

The antimicrobial additive may be present in the compositions described herein in any effective amount, that is, an amount that provides good antimicrobial performance. In some embodiments, good antimicrobial performance means a passing result in one or more of the tests described herein. In some embodiments, the antimicrobial additive is present in the described compositions from 0.1 to 10 percent by weight of the overall composition, or from 0.1 to 5, or from 0.1 to 4 percent by weight. In other embodiments, the antimicrobial additive is present in the described compositions from a lower limit of 0.1, 0.5, or 1.0 to an upper limit of 2.0, 4.0, 5.0, or 10 percent by weight. In some embodiments, the antimicrobial additive is present in the described compositions from 2.0 to 6.0 percent by weight. In still other embodiments, the antimicrobial additive is present in the described compositions from a lower limit of 1.5 or 2.0 to an upper limit of 3.0 or 3.5 percent by weight, or even 2.5 percent by weight.

The Polymeric Material

The disclosed technology makes and makes use of a polymeric material. The polymeric material is made up of a polymeric backbone, which itself is made up of urethane linkages derived from a polyisocyanate and a polyol.

These linkages in the polymeric backbone of the polymeric material are important to the disclosed technology, as it is the reversion of a small number of these linkages that create the active reaction sites which can then react with the antimicrobial additives described above. The following reactions results in new polymeric material where the antimicrobial additives are bond directly into the polymeric backbone of the polymeric material, thus providing the non-leaching antimicrobial properties to the overall composition.

Suitable polymeric materials for use in the processes, compositions, and articles described herein may include any polymeric materials that include urethane linkages derived from a polyisocyanate and a polyol in its backbone or polymer blends which contain one of the polymers in the blend which contains urethane linkages.

In some embodiments, the polymeric material includes a thermoplastic polyurethane derived from (a) a polyisocyanate component, (b) a polyol component, and (c) an optional chain extender component.

In some embodiments, the polymeric material includes a thermoplastic polyurethane derived from (a) a polyisocyanate component, (b) a polyol component.

In some embodiments, the polymeric material includes a thermoplastic polyurethane derived from (a) a polyisocyanate component, (b) a polyol component, and (c) a chain extender component.

The polyisocyanate component may contain one or more polyisocyanates. Suitable polyisocyanates include aromatic diisocyanates, aliphatic diisocyanates, or combinations thereof.

In some embodiments, the polyisocyanate component includes one or more aliphatic diisocyanates. In some embodiments, the polyisocyanate component is essentially free of, or even completely free of, aromatic diisocyanates. In other embodiments, the polyisocyanate component includes one or more aliphatic diisocyanates in combination with one or more aromatic polyisocyanate.

In some embodiments, the polyisocyanate component includes one or more aromatic diisocyanates. In some embodiments, the polyisocyanate component is essentially free of, or even completely free of, aliphatic diisocyanates. In other embodiments, the polyisocyanate component includes one or more aromatic diisocyanates in combination with one or more aliphatic polyisocyanate.

Examples of useful polyisocyanate may include aromatic diisocyanates such as 4,4'-methylenebis(phenyl isocyanate) (MDI), m-xylene diisocyanate (XDI), phenylene-1,4-diisocyanate, naphthalene-1,5-diisocyanate, and toluene diisocyanate (TDI); 3,3'-dimethyl-4,4'-biphenylene diisocyanate (TODI), 1,5-naphthalene diisocyanate (NDI), as well as aliphatic diisocyanates such as hexamethylene dissocyanate (HDI) 4,4'-Diisocyanato dicyclohexylmethane (HMDI), isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), and dicyclohexylmethane-4,4"-diisocyanate (H12MDI). Mixtures of two or more polyisocyanates may be used. In some embodiments, the polyisocyanate is MDI and/or H12MDI. In some embodiments, the polyisocyanate includes MDI. In some embodiments, the polyisocyanate includes H12MDI.

In some embodiments, the mixtures of two or more polyisocyanates may be used.

In some embodiments, the thermoplastic polyurethane is prepared with a polyisocyanate component that includes HDI. In some embodiments, the thermoplastic polyurethane HDI prepared with a polyisocyanate component that consists essentially of H12MDI. In some embodiments, the thermoplastic polyurethane is prepared with a polyisocyanate component that consists of HDI.

In some embodiments, the polyisocyanate used to prepare the TPU and/or TPU compositions described herein is at least 50%, on a weight basis, a cycloaliphatic diisocyanate. In some embodiments, the polyisocyanate includes an α, ω-alkylene diisocyanate having from 5 to 20 carbon atoms.

In some embodiments, the polyisocyanate used to prepare the TPU and/or TPU compositions described herein includes hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, or combinations thereof.

In some embodiments, the described TPU is prepared with a polyisocyanate component that includes HDI, H12MDI, LDI, IPDI, or combinations thereof. In some embodiments, the TPU is prepared with a polyisocyanate component consists of, or even consists essentially of HDI.

In still other embodiments, the polyisocyanate component is essentially free of (or even completely free of) any non-linear aliphatic diisocyanates, any aromatic diisocyanates, or both. In still other embodiments, the polyisocyanate component is essentially free of (or even completely free of) any polyisocyanate other than the linear aliphatic diisocyanates described above.

In some embodiments, the polyisocyanate component is diphenylmethane diisocyanate, H12MDI, hexamethylene diisocyanate, or a combination thereof. In some embodiments, the polyisocyanate component is diphenylmethane diisocyanate. In some embodiments, the polyisocyanate component is hexamethylene diisocyanate.

The polyol component may contain one or more polyols. Polyols suitable for use in the invention may include polyether polyols, polyester polyols, polycarbonate polyols, polysiloxane polyols, and combinations thereof. Suitable polyols, which may also be described as hydroxyl terminated intermediates, when present, may include one or more hydroxyl terminated polyesters, one or more hydroxyl terminated polyethers, one or more hydroxyl terminated polycarbonates, one or more hydroxyl terminated polysiloxanes, or mixtures thereof.

Suitable hydroxyl terminated polyester intermediates include linear polyesters having a number average molecular weight (Mn) of from about 500 to about 10,000, from about 700 to about 5,000, or from about 700 to about 4,000, and generally have an acid number less than 1.3 or less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from 6-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycols described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

The polyol component may also include one or more polycaprolactone polyester polyols. The polycaprolactone polyester polyols useful in the technology described herein include polyester diols derived from caprolactone monomers. The polycaprolactone polyester polyols are terminated by primary hydroxyl groups. Suitable polycaprolactone polyester polyols may be made from ε-caprolactone and a bifunctional initiator such as diethylene glycol, 1,4-butanediol, or any of the other glycols and/or diols listed herein. In some embodiments, the polycaprolactone polyester polyols are linear polyester diols derived from caprolactone monomers.

Useful examples include CAPA™ 2202A, a 2,000 number average molecular weight (Mn) linear polyester diol, and CAPA™ 2302A, a 3,000 Mn linear polyester diol, both of which are commercially available from Perstorp Polyols Inc. These materials may also be described as polymers of 2-oxepanone and 1,4-butanediol.

The polycaprolactone polyester polyols may be prepared from 2-oxepanone and a diol, where the diol may be 1,4-butanediol, diethylene glycol, monoethylene glycol, 1,6-hexanediol, 2,2-dimethyl-1,3-propanediol, or any combination thereof. In some embodiments, the diol used to prepare the polycaprolactone polyester polyol is linear. In some embodiments, the polycaprolactone polyester polyol has a number average molecular weight from 500 to 10,000, or from 500 to 3,000, or 600 to 1,000, or 1,000 to 3,000 or from 500, or 600, or from 1,000 or even 2,000 to 4,000 or even 3,000, or even about 2,000.

Suitable hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. In some embodiments, the polyether intermediate includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the described compositions. Typical copolyethers include the reaction product of THF and ethylene oxide or THF and propylene oxide. These are available from BASF as PolyTHF® B, a block copolymer, and PolyTHF® R, a random copolymer. The various polyether intermediates generally have a number average molecular weight (Mn) as determined by assay of the terminal functional groups which is an average molecular weight greater than about 700, such as from about 700 to about 10,000, from about 1,000 to about 5,000, or from about 1,000 to about 2,500. In some embodiments, the polyether intermediate includes a blend of two or more different molecular weight polyethers, such as a blend of 2,000 Mn and 1,000 Mn PTMEG.

Suitable hydroxyl terminated polycarbonates include those prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms. Suitable diols include aliphatic diols containing 4 to 12 carbon atoms such as 1,4-butanediol, 1,5-pentanediol, neopentyl glycol, 1,6-hexanediol, 2,2,4-trimethyl-1,6-hexanediol, 1,10-decanediol, hydrogenated dilinoleylglycol, hydrogenated dioleylglycol, 3-methyl-1,5-pentanediol; and cycloaliphatic diols such as 1,3-cyclohexanediol, 1,4-dimethylolcyclohexane, 1,4-cyclohexanediol-, 1,3-dimethylolcyclohexane-, 1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenyl carbonate, ditolylcarbonate, and dinaphthylcarbonate.

Suitable polysiloxane polyols include α-ω-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

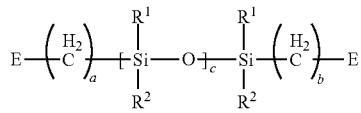

in which: each R1 and R2 are independently a 1 to 4 carbon atom alkyl group, a benzyl, or a phenyl group; each E is OH or $NHR^3$ where $R^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is $NHR^3$. In the hydroxyl-containing polysiloxanes, at least one of the E groups is OH. In some embodiments, both $R^1$ and $R^2$ are methyl groups.

Suitable examples include α,ω-hydroxypropyl terminated poly(dimethysiloxane) and α,ω-amino propyl terminated poly(dimethysiloxane), both of which are commercially available materials. Further examples include copolymers of the poly(dimethysiloxane) materials with a poly(alkylene oxide).

The polyol component, when present, may include poly(ethylene glycol), poly(tetramethylene ether glycol), poly(trimethylene oxide), ethylene oxide capped poly(propylene glycol), poly(butylene adipate), poly(ethylene adipate), poly(hexamethylene adipate), poly(tetramethylene-co-hexamethylene adipate), poly(3-methyl-1,5-pentamethyl ene adipate), polycaprolactone diol, poly(hexamethylene carbonate) glycol, poly(pentamethylene carbonate) glycol, poly(trimethylene carbonate) glycol, dimer fatty acid based polyester polyols, vegetable oil based polyols, or any combination thereof.

Examples of dimer fatty acids that may be used to prepare suitable polyester polyols include Priplast™ polyester glycols/polyols commercially available from Croda and Radia® polyester glycols commercially available from Oleon.

In some embodiments, the polyol component includes a polyether polyol, a polycarbonate polyol, a polycaprolactone polyol, or any combination thereof.

In some embodiments, the polyol component includes a polyether polyol. In some embodiments, the polyol component is essentially free of or even completely free of polyester polyols. In some embodiments, the polyol component used to prepare the TPU is substantially free of, or even completely free of polysiloxanes.

In some embodiments, the polyol component includes ethylene oxide, propylene oxide, butylene oxide, styrene oxide, poly(tetramethylene ether glycol), poly(propylene glycol), poly(ethylene glycol), copolymers of poly(ethylene glycol) and poly(propylene glycol), epichlorohydrin, and the like, or combinations thereof. In some embodiments the polyol component includes poly(tetramethylene ether glycol).

In other embodiments, the polyol component is essentially free of (or even completely free of) any polyether polyols, polycarbonate polyols, polysiloxane polyols, or all of the above.

Suitable polyamide oligomers, including telechelic polyamide polyols, are not overly limited and include low molecular weight polyamide oligomers and telechelic polyamides (including copolymers) that include N-alkylated amide groups in the backbone structure. Telechelic polymers are macromolecules that contain two reactive end groups. Amine terminated polyamide oligomers can be useful as polyols in the disclosed technology. The term polyamide oligomer refers to an oligomer with two or more amide linkages, or sometimes the amount of amide linkages will be specified. A subset of polyamide oligomers are telechelic polyamides. Telechelic polyamides are polyamide oligomers with high percentages, or specified percentages, of two functional groups of a single chemical type, e.g. two terminal amine groups (meaning either primary, secondary, or mixtures), two terminal carboxyl groups, two terminal hydroxyl groups (again meaning primary, secondary, or mixtures), or two terminal isocyanate groups (meaning aliphatic, aromatic, or mixtures). Ranges for the percent difunctional that can meet the definition of telechelic include at least 70, 80, 90 or 95 mole % of the oligomers being difunctional as opposed to higher or lower functionality. Reactive amine terminated telechelic polyamides are telechelic polyamide oligomers where the terminal groups are both amine types, either primary or secondary and mixtures thereof, i.e. excluding tertiary amine groups.

In some embodiments, the polyol component is a polyether polyol. In some embodiments, the polyether polyol is PTMEG.

In some embodiments, the chain extender component may contain one or more chain extenders. Chain extenders suitable for use in the invention may include at least one diol chain extender of the general formula $HO-(CH_2)_x-OH$ wherein x is an integer from 2 to 12 or even from 4 to 6. In other embodiments, x is the integer 4.

Useful extenders also include diol chain extenders such as relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy)phenyl]propane (HEPP), heptanediol, nonanediol, dodecanediol, ethylenediamine, butanediamine, hexamethylenediamine, and hydroxyethyl resorcinol (HER), and the like, as well as mixtures thereof. In some embodiments, the chain extender includes BDO, HDO, or a combination thereof. In some embodiments, the chain extender includes BDO. Other glycols, such as aromatic glycols could be used, but in some embodiments the TPUs described herein are essentially free of or even completely free of such materials, or a combination thereof.

In some embodiments, the chain extender includes a cyclic chain extender. Suitable examples include CHDM, HEPP, HER, and combinations thereof. In some embodiments, the chain extender may include an aromatic cyclic chain extender, for example HEPP, HER, or a combination thereof. In some embodiments, the chain extender may include an aliphatic cyclic chain extender, for example CHDM. In some embodiments, the chain extender is substantially free of, or even completely free of aromatic chain extenders, for example aromatic cyclic chain extenders. In some embodiments, the chain extender is substantially free of, or even completely free of polysiloxanes.

In some embodiments, the chain extender component is butane diol.

The Antimicrobial Polymeric Material

The polymeric material described herein generally include one or more of the thermoplastic polyurethane (TPU) materials described above.

The polymeric material may also include one or more additional components. These additional components include other polymeric materials that may be blended with the TPU described herein. These additional components also include one or more additives that may be added to the TPU, or blend containing the TPU, to impact the properties of the composition.

The TPU described herein may also be blended with one or more other polymers. The polymers with which the TPU described herein may be blended are not overly limited. In some embodiments, the described compositions include a two or more of the described TPU materials. In some embodiments, the compositions include at least one of the described TPU materials and at least one other polymer, which is not one of the described TPU materials. In some embodiments, the described blends will have the same combination of properties described above for the TPU composition. In other embodiments, the TPU composition will of course have the described combination of properties, while the blend of the TPU composition with one or more of the other polymeric materials described above may or may not.

Polymers that may be used in combination with the TPU materials described herein also include more conventional TPU materials such as non-caprolactone polyester-based TPU, polyether-based TPU, or TPU containing both non-caprolactone polyester and polyether groups. Other suitable materials that may be blended with the TPU materials described herein include polycarbonates, polyolefins, styrenic polymers, acrylic polymers, polyoxymethylene polymers, polyamides, polyphenylene oxides, polyphenylene sulfides, polyvinylchlorides, chlorinated polyvinyl chlorides, polylactic acids, or combinations thereof.

Polymers for use in the blends described herein include homopolymers and copolymers. Suitable examples include: (i) a polyolefin (PO), such as polyethylene (PE), polypropylene (PP), polybutene, ethylene propylene rubber (EPR), polyoxyethylene (POE), cyclic olefin copolymer (COC), or combinations thereof; (ii) a styrenic, such as polystyrene (PS), acrylonitrile butadiene styrene (ABS), styrene acrylonitrile (SAN), styrene butadiene rubber (SBR or HIPS), polyalphamethylstyrene, styrene maleic anhydride (SMA), styrene-butadiene copolymer (SBC) (such as styrene-butadiene-styrene copolymer (SBS) and styrene-ethyl ene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof; (iii) a thermoplastic polyurethane (TPU) other than those described above; (iv) a polyamide, such as Nylon™, including polyamide 6,6 (PA66), polyamide 1,1 (PA11), polyamide 1,2 (PA12), a copolyamide (COPA), or combinations thereof; (v) an acrylic polymer, such as polymethyl acrylate, polymethylmethacrylate, a methyl methacrylate styrene (MS) copolymer, or combinations thereof; (vi) a polyvinylchloride (PVC), a chlorinated polyvinylchloride (CPVC), or combinations thereof; (vii) a polyoxyemethylene, such as polyacetal; (viii) a polyester, such as polyethylene terephthalate (PET), polybutylene terephthalate (PBT), copolyesters and/or polyester elastomers (COPE) including polyether-ester block copolymers such as glycol modified polyethylene terephthalate (PETG), polylactic acid (PLA), polyglycolic acid (PGA), copolymers of PLA and PGA, or combinations thereof; (ix) a polycarbonate (PC), a polyphenylene sulfide (PPS), a polyphenylene oxide (PPO), or combinations thereof; or combinations thereof.

In some embodiments, these blends include one or more additional polymeric materials selected from groups (i), (iii), (vii), (viii), or some combination thereof. In some embodiments, these blends include one or more additional polymeric materials selected from group (i). In some embodiments, these blends include one or more additional polymeric materials selected from group (iii). In some embodiments, these blends include one or more additional polymeric materials selected from group (vii). In some embodiments, these blends include one or more additional polymeric materials selected from group (viii).

The additional additives suitable for use in the TPU compositions described herein are not overly limited. Suitable additives include pigments, UV stabilizers, UV absorbers, antioxidants, lubricity agents, heat stabilizers, hydrolysis stabilizers, cross-linking activators, flame retardants, layered silicates, radio opacifiers, such as barium sulfate, tungsten metal, non-oxide bismuth salts, fillers, colorants, reinforcing agents, adhesion mediators, impact strength modifiers, antimicrobials, and any combination thereof.

The TPU compositions described herein may also include additional additives, which may be referred to as a stabilizer. The stabilizers may include antioxidants such as phenolics, phosphites, thioesters, and amines, light stabilizers such as hindered amine light stabilizers and benzothiazole UV absorbers, and other process stabilizers and combinations thereof. In one embodiment, the preferred stabilizer is Irganox®-1010 from BASF and Naugard®-445 from Chemtura. The stabilizer is used in the amount from about 0.1 weight percent to about 5 weight percent, in another embodiment from about 0.1 weight percent to about 3 weight percent, and in another embodiment from about 0.5 weight percent to about 1.5 weight percent of the TPU composition.

Still further optional additives may be used in the TPU compositions described herein. The additives include colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, radioopacifiers, reinforcing agents and combinations thereof.

All of the additives described above may be used in an effective amount customary for these substances. These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

The Process

The disclosed technology includes a process for making the described antimicrobial polymer compositions. The described process includes the step of mixing one or more antimicrobial additives, which are described above, into a one or more polymeric materials, which are also described above. The polymeric material includes a polymeric backbone made up of urethane linkages derived from a polyisocyanate and a polyol. The mixing occurs under conditions that result in the breaking of a minority of said urethane bonds resulting in reactive isocyanate groups. Two or more of said reactive isocyanate groups react with said antimicrobial additive to covalently bond said antimicrobial additive into the polymeric backbone of said polymeric material. The resulting materials is an antimicrobial polymer composition.

The disclosed technology provides the desired result of a non-leaching antimicrobial polymer composition when the antimicrobial additive has two or more of the described reactive groups capable of reacting with isocyanate groups and the mixing of the polymeric material and the antimicrobial additive is done under control conditions that result in a small number of the urethane linkages in the polymeric backbone of the polymeric material to reverse, or dissociate, and the relatively small number of broken polymer chains that now have reactive isocyanate groups react with the antimicrobial additive such that new polymers are formed where the broken polymer backbones reform with the antimicrobial additive present in the new backbone. Thus, the antimicrobial additive is not present as a pendant group connected to or bonded to the polymeric backbone. Further the antimicrobial additive is not present as a terminal group connected to or bonded to end of the polymeric chain. Rather the antimicrobial additive of the disclosed technology is randomly bonded into the backbone of the polymeric material itself. Still further, the benefits of the disclosed technology cannot be achieved if the antimicrobial additive is added during the synthesis of the polymeric material, as the antimicrobial additive would not be properly disbursed throughout the backbones of the resulting polymeric material and/or would create unwanted side reactions during the synthesis of the TPU. Also, since most antimicrobial additives have more than two reactive sites, they would act as cross linkers, forming an unusable high crosslinked polymeric material unsuitable for the uses and applications described herein. Finally, simply adding the antimicrobial additive to the polymeric material under conditions that do not create the backbone breaking and reforming described here would not result in polymeric materials with the antimicrobial additives bonded into the backbone, but rather only simple mixtures where the antimicrobial additives is not bond to the polymeric material and where leaching would occur.

The non-leaching antimicrobial polymeric compositions of the disclosed technology, where the antimicrobial additives are bonded into the backbone of the polymeric material, are achieved by careful control of the conditions under which the polymeric material and antimicrobial additive are mixed. Particularly the temperature of the extrusion and the configuration of the extruder screw are important to insuring that sufficient thermal energy to adequately reverse the urethane bonds to yield reactive isocyanate groups. The exact temperature and screw configuration which yields antimicrobial and non-leaching polymeric products will depend on what type of isocyanate is used to produce the TPU in the formulation since it is well known by those skilled in the art that aliphatic urethane bonds reverse to give isocyanate groups at a lower temperature than aromatic urethane bonds and as a result, if an aliphatic TPU is used in the formulation, a lower temperature for the extrusion to produce the antimicrobial TPU can be used when compared to an aromatic TPU.

First, the thermoplastic polyurethanes of the invention can be prepared by processes which are conventional in the art for the synthesis of polyurethane elastomers such as but not limited to a two-step, batch process or a one-shot technique. In a two-step process, a prepolymer intermediate is reacted with an excess amount of diisocyanate, followed by chain extending the same. In the batch process, the components, i.e., the diisocyanate(s), the polyol(s), and the chain extenders (s), as well as the catalyst(s) and any other additive(s), if desired, are introduced into a container, mixed, dispensed into trays and allowed to cure. The cured TPU can then be granulated and pelletized. The one-shot procedure is performed in an extruder, e.g. single screw, twin screw, wherein the formative components, introduced individually or as a mixture into the extruder.

One or more polymerization catalysts may be present during the polymerization reaction. Generally, any conventional catalyst can be utilized to react the diisocyanate with the polyol intermediates or the chain extender. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organometallic compounds, such as titanic esters, iron compounds, e.g. ferric acetyl acetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

The TPU materials described above may be prepared by a process that includes the step of (I) reacting: a) the polyisocyanate component described above, that includes at least one aliphatic diisocyanate; b) the polyol component described above, that includes at least one polyester polyol;

and c) the chain extender component described above that includes a substituted 2,5-diketopiperazine, as described above.

The process may further include the step of: (II) mixing the TPU composition of step (I) with one or more blend components, including one or more additional TPU materials and/or polymers, including any of those described above.

The process may further include the step of: (II) mixing the TPU composition of step (I) with one or more additional additives selected from the group consisting of pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, and antimicrobials.

The process may further include the step of: (II) mixing the TPU composition of step (I) with one or more blend components, including one or more additional TPU materials and/or polymers, including any of those described above, and/or the step of: (III) mixing the TPU composition of step (I) with one or more additional additives selected from the group consisting of pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, and antimicrobials.

The process may further include in step I of including a co-extender component that includes at least one diol chain extender of the general formula $HO-(CH_2)_x-OH$ wherein x is an integer from 2 to 6.

Once the TPU is ready, it can be used as the polymeric material of the disclosed process and it can be mixed with the antimicrobial additive described above.

The carefully controlled mixing conditions must effectively melt the polymeric material, effectively mix the antimicrobial additive into the polymeric material, and also effectively reverse, or dissociate, a small number of urethane bonds in the backbone of the polymeric material.

In some embodiments, while not wishing to be bound by theory, applicants believe there is a dissociating a small number of urethane bonds in the backbone of the polymeric material. By this we mean, in some embodiments, less than 20% of all the bonds in the backbone of the polymeric material, or less than 10%, or less than 5% or less than 2%. In other embodiments, it means from 0.1 to 20% of the bonds, or from 0.1 to 10, 0.1 to 5, 0.1 to 2% of the urethane bonds. In other embodiments, it means from 1 to 20% of the bonds, or from 1 to 10, 1 to 5, 1 to 2% of the urethane bonds. In still other embodiments it means from about 0.1, 0.2, 0.5, or 1% to 2, 3, or 5% of the urethane bonds. In some embodiments, dissociating a small number of urethane bonds in the backbone of the polymeric material means from 0.1% to 2% or form 0.1 to 5% of all the urethane bonds in the backbone of the polymeric material. For additional information on urethane bond breaking, see Chemical Review, 2013, 113 (1), pp 80-118 and Macromolecular Materials and Engineering, 2003, 288 (6), pp 525-530, which are both incorporated by reference.

The disclosed technology further discloses the described process where the mixing occurs in a mixing device at a temperature from 160 to 225 degrees Celsius. The mixing may also occur from 180 to 225, or from 160 to 200 degrees Celsius.

In some embodiments, where the polymeric materials includes an aliphatic TPU (a TPU made from an aliphatic diisocyanate), the mixing occurs in a mixing device at a temperature from 160 to 200 degrees Celsius. The mixing may also occur from 155 to 175, or from 160 to 180, or even from 165 to 185 degrees Celsius.

In some embodiments, where the polymeric materials includes an aromatic TPU (a TPU made from an aromatic diisocyanate), the mixing occurs in a mixing device at a temperature from 180 to 220 degrees Celsius. The mixing may also occur from 175 to 215, or from 180 to 220, or even from 185 to 225 degrees Celsius.

The disclosed technology further discloses the described process where the mixing occurs in an extruder where the antimicrobial additive is added to the polymeric material and wherein said mixing occurs at a temperature between 180 and 225 degrees Celsius, where the extruder comprises a twin screw extruder with co-rotating, self-wiping screws, with a mixture of conveying and mixing elements, and a length to diameter ratio of 30:1 to 50:1. In other embodiments the described process in the described extruder occurs at 160 to 200, 155 to 175, 160 to 180, or 165 to 185 degrees Celsius. In other embodiments, the described process in the described extruder occurs at 180 to 220, 175 to 215, 180 to 220, or 185 to 225 degrees Celsius.

The Articles

The compositions described herein may be used in the preparation of one or more articles. The specific type of articles that may be made from the TPU materials and/or compositions described herein are not overly limited.

The invention further provides an article made with the TPU materials and/or compositions described herein. Examples include but are not limited to medical applications, as well as used in, personal care applications, pharmaceutical applications, health care product applications, or any other number of applications. These articles may be prepared by extruding, injection molding, or any combination.

In some embodiments, the compositions described herein are used to make tubular medical devices. Tubular medical articles within the meaning of the present invention are those medical articles that can conduct fluids. In particular, the medical articles are selected from the group consisting of catheters, central venous catheters, peripheral venous catheters, breathing tubes, stents, couplings, ports, conduit systems, connectors, spikes, valves, three-way stopcocks, syringes, conduits, injection ports, wound drains, thoracic drains and probes.

Other suitable medical articles that can be made using the compositions of described here include central venous catheters; peripheral venous catheters; breathing tubes, stents; products for application in regional anesthesia, especially catheters, couplings, filters; products for infusion therapy, especially containers, ports, conduit systems, filters; accessories, such as connectors, spikes, valves, three-way stopcocks, syringes, conduits, injection ports; products of formulation, especially transfer sets, mixing sets; urological products, especially catheters, urine measuring and collecting devices; wound drains; wound dressing; surgical suture materials; implantation auxiliaries as well as implants, especially plastic implants, for example, hernia meshes, nonwovens, knitwear/knitted fabrics, ports, port catheters, vascular prostheses; disinfectants; disposable surgical instruments; thoracic drains; probes; catheters; housings of medical devices, especially infusion pumps, dialysis devices and screens; artificial dentures; containers for liquids, especially contact lens containers. Other suitable applications for the compositions disclosed here include food processing equipment and cosmetic materials.

In some embodiments, the compositions described herein are used to make PICC catheters and CVC catheters.

Antimicrobial Properties

Persons skilled in the art are well aware of what is meant by the term "antimicrobial." Moreover, persons skilled in the art are familiar with a wide variety of chemical substances that have antimicrobial properties. Nevertheless, Applicants provide a quantitative definition of the term "antimicrobial" in the context of the present invention. An antimicrobial additive of the present invention is an additive which imparts to the polymer containing it the ability to reduce the concentration of E. coli at the surface of the polymer by a factor of 50%.

The disclosed technology further discloses the described process where the resulting antimicrobial polymer composition is non-leaching as determined by exhibiting a zero zone of inhibition in the AATCC 147 Assessment of Antimicrobial Finishes on Textile Materials: Parallel Streak Method.

In other embodiments, the TPU materials and/or compositions described herein may be used to produce medical devices, such as implants or coatings on implants, where the TPU delivers one or more therapeutic agents at the site of implantation. The terms "therapeutic agents" and "drugs" are used herein interchangeably to mean any material that has a therapeutic effect at an implantation site. Also as used herein, the device of the present invention is said to "deliver" or "elute" therapeutic agent—these terms are used synonymously and generally to refer to any mechanism by which the therapeutic agent comes into contact with tissue.

The therapeutic agent(s) may be delivered in a number of ways. In one example, the therapeutic agent(s) are embedded within a coating that is made using the TPU materials and/or compositions described herein that adheres to one or more surfaces of an implant or other medical article or medical device. In some embodiments, the coating is made from one or more of the TPU materials and/or compositions described herein admixed with the therapeutic agent(s) such that the agent is eluted from the polymer over time, or is released from the coating as it degrades in-vivo. In some embodiments one or more therapeutic agents are applied in discrete areas on one or more individual section or surfaces of the implant or other medical article or medical device.

The amount of each chemical component described is presented exclusive of any solvent which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

According to the present invention, "substantially free" means that the described material may be present in an amount below 1% by weight, preferably below 0.5% by weight, more preferably below 0.01% by weight, the weight percentages being based on the total weight of the composition for the preparation of the tubular medical article.

It is known that some of the materials described above may interact in the final formulation, so that the components of the final formulation may be different from those that are initially added. For instance, metal ions (of, e.g., a flame retardant) can migrate to other acidic or anionic sites of other molecules. The products formed thereby, including the products formed upon employing the composition of the technology described herein in its intended use, may not be susceptible of easy description. Nevertheless, all such modifications and reaction products are included within the scope of the technology described herein; the technology described herein encompasses the composition prepared by admixing the components described above.

EXAMPLES

The technology described herein may be better understood with reference to the following non-limiting examples.

The examples provided below are evaluated to determine if they are non-eluting by the zone of inhibition (ZOI) test and also tested to determine their antimicrobial performance by various tests including JIS Z2801, the QualityLab Certika™ Assay and/or the Innovotech BEST™ Assay.

Materials:

The following materials were used in the preparation of Examples 1 to 3:
(1) free base PHMB, (deprotonated) PHMB obtained from Matrix.
(2) neutral PHMB, a neutral pH protonated PHMB obtained from Lonza.
(3) TPU A, Tecothane™ TT1095A, and aromatic polyether TPU of 93 Shore A hardness commercially available from Lubrizol.
(4) TPU B, Tecoflex™ EG93A-B30, an aliphatic polyether TPU of 90 Shore A hardness commercially available from Lubrizol, modified with a radiopacifier.

Preparation of antimicrobial polymeric compositions: For each example an antimicrobial additive PHMB and a TPU is fed with gravimetric feeders into a 26 mm twin screw extruder with co-rotating, self-wiping screws with both conveying and mixing elements and a L/D ratio of 39:1. The strands are extruded into a chilled water bath and cut into pellets. Pellets are later compression molded into films or extruded into tubing for additional testing. Additive loading level was confirmed by NMR and in all cases was essentially equal to the ratio of additives fed into the extruder. Formulations and performance results are summarized in Table 1.

The Examples shown below are tested for antimicrobial efficacy by the standard test method JIS Z2801. Results of antimicrobial efficacy testing on various compositions are indicated in Table 1.

The example shown below are also evaluated for their antimicrobial and non-leaching properties.

The JIS Z 2801 test method is designed to quantitatively test the ability of hard surfaces to inhibit the growth of microorganisms or kill them, over a 24 hour period of contact. In the JIS Z 2801 Test: (i) the test microorganism is prepared, (ii) the suspension of test microorganism is standardized by dilution in a nutritive broth, (iii) control and test surfaces are inoculated with microorganisms and the microbial inoculum is covered with a thin, sterile film, (iv) microbial concentrations are determined at "time zero" by elution followed by dilution and plating, (v) a control is run with the samples, (vi) samples are incubated undisturbed in a humid environment for 24 hours, (vii) after incubation, microbial concentrations are determined. The reduction of microorganisms relative to initial concentrations and the control surface is calculated, thus higher results indicate better antimicrobial performance. The examples were also analyzed by GPC for weight average molecular weight (MW) and poly dispersity index (PDI). The molecular weight was measured using a Waters Model 515 pump GPC with a Waters Model 717 Auto-sampler, a Waters Model 2414 Refractive Index @ 40° C. using a PLgel Guard+2×Mixed D (5u), 300×7.5 mm column set with a THF, stabilized with 250 ppm BHT, 1.0 ml/min, @ 40° C. mobile phase and an injection volume of 50 µl (i.e. a concentration ~0.12%). The molecular weight calibration curve was established with EasiCal polystyrene standards from Polymer Laboratories.

TABLE 1

| Formulation | JIS Z2801 S. aureus (log. Red.) | JIS Z2801 E. coli (log. Red.) | ZOI | MW | PDI |
|---|---|---|---|---|---|
| Example 1 TPU A | n/a | n/a | positive | 180 k | 2.1 |
| Example 2 1% Matrix PHMB in TPU A | >4.8 | 2.3 | negative | 92 k | 2.5 |
| Example 3 TPU B | n/a | n/a | positive | 73 k | 1.9 |
| Example 4 4% Lonza PHMB in TPU B | >5.20 | >5.05 | negative | 81 k | 2.1 |

The results show that when free base PHMB (i.e. deprotonated PHMB) is used, antimicrobial performance is significantly improved compared to the TPU itself. Further the results show that 1% of PHMB in a TPU give comparable antimicrobial performance to a TPU treated with 4% of a protonated PHMB.

Table 2 shows additional examples which may be tested for their antimicrobial performance, where different forms and amounts of PHMB are used:

TABLE 2

| Example | TPU | % Matrix PHMB | % Lonza PHMB |
|---|---|---|---|
| 2-1 | TPU A | 0% | 0% |
| 2-2 | TPU A | 0.5% | 0% |
| 2-3 | TPU A | 1% | 0% |
| 2-4 | TPU A | 2% | 0% |
| 2-5 | TPU A | 5% | 0% |
| 2-6 | TPU A | 0% | 0.5% |
| 2-7 | TPU A | 0% | 1% |
| 2-8 | TPU A | 0% | 2% |
| 2-9 | TPU A | 0% | 5% |
| 2-10 | TPU A | 1% | 1% |
| 2-11 | TPU B | 0% | 0% |
| 2-12 | TPU B | 0.5% | 0% |
| 2-13 | TPU B | 1% | 0% |
| 2-14 | TPU B | 2% | 0% |
| 2-15 | TPU B | 5% | 0% |
| 2-16 | TPU B | 0% | 0.5% |
| 2-17 | TPU B | 0% | 1% |
| 2-18 | TPU B | 0% | 2% |
| 2-19 | TPU B | 0% | 5% |
| 2-20 | TPU B | 1% | 1% |

Table 3 shows additional examples which may be tested for their antimicrobial performance, where different processing is used. An example marked "hot" means the mixing of the composition is carried out above 225 degrees Celsius. An example marked "cold" means the mixing of the composition is carried out below 170 degrees Celsius.

TABLE 3

| Example | TPU | % Matrix PHMB | % Lonza PHMB |
|---|---|---|---|
| 3-1 hot | TPU A | 0% | 0% |
| 3-2 hot | TPU A | 0.5% | 0% |
| 3-3 hot | TPU A | 1% | 0% |
| 3-4 hot | TPU A | 2% | 0% |
| 3-5 hot | TPU A | 5% | 0% |
| 3-6 hot | TPU A | 0% | 0.5% |
| 3-7 hot | TPU A | 0% | 1% |
| 3-8 hot | TPU A | 0% | 2% |
| 3-9 hot | TPU A | 0% | 5% |
| 3-10 hot | TPU A | 1% | 1% |
| 3-11 cold | TPU A | 0% | 0% |
| 3-12 cold | TPU A | 0.5% | 0% |
| 3-13 cold | TPU A | 1% | 0% |
| 3-14 cold | TPU A | 2% | 0% |
| 3-15 cold | TPU A | 5% | 0% |
| 3-16 cold | TPU A | 0% | 0.5% |
| 3-17 cold | TPU A | 0% | 1% |
| 3-18 cold | TPU A | 0% | 2% |
| 3-19 cold | TPU A | 0% | 5% |
| 3-20 cold | TPU A | 1% | 1% |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the technology described herein can be used together with ranges or amounts for any of the other elements.

As described hereinafter the molecular weight of the materials described above have been determined using known methods, such as GPC analysis using polystyrene standards. Methods for determining molecular weights of polymers are well known. The methods are described for instance: (i) P. J. Flory, "Principles of star polymer Chemistry", Cornell University Press 91953), Chapter VII, pp 266-315; or (ii) "Macromolecules, an Introduction to star polymer Science", F. A. Bovey and F. H. Winslow, Editors, Academic Press (1979), pp 296-312. As used herein the weight average and number weight average molecular weights of the materials described are obtained by integrating the area under the peak corresponding to the material of interest, excluding peaks associated with diluents, impurities, uncoupled star polymer chains and other additives.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration. That is "consisting essentially of" permits the inclusion of substances that do not materially affect the basic and novel characteristics of the composition under consideration.

While certain representative embodiments and details have been shown for the purpose of illustrating the subject technology described herein, it will be apparent to those skilled in this art that various changes and modifications can be made therein without departing from the scope of the subject invention. In this regard, the scope of the technology described herein is to be limited only by the following claims.

What is claimed is:

1. A process of making an antimicrobial polymer composition, said process comprising the steps of:
   a) mixing an antimicrobial additive into a polymeric material, wherein said antimicrobial additive comprises deprotonated polyhexamethylene biguanide;
   wherein said polymeric material comprises a polymeric backbone made up of urethane linkages derived from a polyisocyanate and a polyol; and
   wherein said mixing occurs under conditions that result in the breaking of a minority of said urethane bonds resulting in reactive isocyanate groups; and
   wherein two or more of said reactive isocyanate groups react with said antimicrobial additive to covalently bond said antimicrobial additive into the polymeric backbone of said polymeric material;
   resulting in an antimicrobial polymer composition.

2. The process of claim 1 wherein said polymeric material comprises a thermoplastic polyurethane derived from (a) a polyisocyanate component, (b) a polyol component, and (c) an optional chain extender component.

3. The process of claim 1 wherein said polymeric material comprises a thermoplastic polyurethane derived from (a) diphenylmethane diisocyanate, (b) a polyether polyol, and (c) a butane diol component.

4. The process of claim 1 wherein said mixing occurs at a temperature between 180 and 225 degrees Celsius.

5. The process of claim 1 wherein said mixing occurs in an extruder where the antimicrobial additive is added to the polymeric material and wherein said mixing occurs at a temperature between 180 and 225 degrees Celsius, where the extruder comprises a twin screw extruder with co-rotating, self-wiping screws, with a mixture of conveying and mixing elements, and a length to diameter ratio of 30:1 to 50:1.

6. The process of claim 1,
   wherein said reactive isocyanate groups reacts with said antimicrobial additive and said polymeric material to covalently bond said antimicrobial additive to the polymeric backbone of said polymeric material; and
   wherein said mixing occurs at a temperature between 180 and 225 degrees Celsius.

7. The process of claim 1,
   wherein said polymeric material comprises a thermoplastic polyurethane derived from (a) diphenylmethane diisocyanate, (b) an aromatic polyether polyol, and (c) a butane diol component,
   wherein said mixing occurs in an extruder where the antimicrobial additive is added to the polymeric material and wherein said mixing occurs at a temperature between 180 and 225 degrees Celsius, where the extruder comprises a twin screw extruder with co-rotating, self-wiping screws, with a mixture of conveying and mixing elements, and a length to diameter ratio of 30:1 to 50:1.

8. The process of claim 1 wherein the resulting antimicrobial polymer composition is non-leaching as determined by the AATCC 147 Assessment of Antimicrobial Finishes on Textile Materials: Parallel Streak Method.

9. An antimicrobial polymer composition comprising a polymeric material and an antimicrobial additive deprotonated polyhexamethylene biguanide,
   wherein said polymeric material comprises a polymeric backbone comprising urethane linkages derived from a polyisocyanate and a polyol; and
   wherein said antimicrobial additive is covalently bonded into said polymeric backbone of the polymeric material by two or more linkages between the nitrogen atoms of the guanide or biguanide and the isocyanate.

10. The antimicrobial polymer composition of claim 9,
    wherein said polymeric material comprises a thermoplastic polyurethane derived from (a) diphenylmethane diisocyanate, (b) a polyether polyol, and (c) a butane diol component.

11. An article comprising an antimicrobial polymer composition,
    wherein said antimicrobial polymer composition comprises a polymeric material and an antimicrobial additive, wherein said antimicrobial additive comprises deprotonated polyhexamethylene biguanide,
    wherein said polymeric material comprises a polymeric backbone comprising urethane linkages derived from a polyisocyanate and a polyol; and
    wherein said antimicrobial additive is covalently bonded into said polymeric backbone of the polymeric material by two or more isocyanate linkages.

12. The article of claim 11,
    wherein said polymeric material comprises a thermoplastic polyurethane derived from (a) diphenylmethane diisocyanate, (b) a polyether polyol, and (c) a butane diol component.

13. The article of claim 11, wherein the antimicrobial polymer composition is coated onto a material forming the article.

* * * * *